US012692361B2

(12) United States Patent
Murray et al.

(10) Patent No.: US 12,692,361 B2
(45) Date of Patent: Jul. 28, 2026

(54) GRAPHENE-MODIFIED POLYMERIC FOAM AND ARTICLES MADE THEREOF

(71) Applicant: NanoXplore Inc., Montreal (CA)

(72) Inventors: Scott Murray, Lansing, MI (US); Allan James, Lansing, MI (US); Liya Wang, Lansing, MI (US)

(73) Assignee: NanoXplore Inc., Montreal (CA)

( * ) Notice: Subject to any disclaimer, the term of this patent is extended or adjusted under 35 U.S.C. 154(b) by 0 days.

(21) Appl. No.: 17/799,338

(22) PCT Filed: Feb. 16, 2021

(86) PCT No.: PCT/US2021/018168
§ 371 (c)(1),
(2) Date: Aug. 12, 2022

(87) PCT Pub. No.: WO2021/167881
PCT Pub. Date: Aug. 26, 2021

(65) Prior Publication Data
US 2023/0138169 A1 May 4, 2023

Related U.S. Application Data

(60) Provisional application No. 62/977,535, filed on Feb. 17, 2020.

(51) Int. Cl.
*C08K 3/04* (2006.01)
*C08J 9/00* (2006.01)

(52) U.S. Cl.
CPC ............. *C08K 3/042* (2017.05); *C08J 9/0061* (2013.01); *C08J 9/0071* (2013.01); *C08J 2375/08* (2013.01)

(58) Field of Classification Search
CPC ...................................... C08K 3/042
See application file for complete search history.

(56) References Cited

U.S. PATENT DOCUMENTS 6,759,446 B2 7/2004 Lee et al.
2019/0322789 A1* 10/2019 Lubitz ................ C08G 18/7671

FOREIGN PATENT DOCUMENTS

CN         106739319 A    5/2017
KR    1020110107675 A   10/2011
(Continued)

OTHER PUBLICATIONS

Rodríguez-Pérez et al., "The effect of cell size on the physical properties of crosslinked closed sell polyethylene foams produced by a high pressure nitrogen solution process," Cellular Polymers, vol. 21, No. 3, May 2002, pp. 165-194.
(Continued)

*Primary Examiner* — William D Young
(74) *Attorney, Agent, or Firm* — COOLEY LLP

(57) ABSTRACT

Graphene-modified polymeric foam materials are provided that are amenable to conventional foams to yield articles with superior properties relative to like articles absent the graphene cell modifier. Graphene-based cell modifiers are incorporated in the polymer before or during the foaming process to not only improve the mechanical, thermal, electrical, fire retardant, or barrier properties of the polymer matrix itself, but also help modify the size, density, and morphology of cells in the foam, thereby tailoring the properties of the final foam articles. The graphene-modified polymeric foam materials may be utilized for the manufacturing of articles for mechanical, thermal, noise reduction, or sound absorption applications. The graphene-modified foams and articles made thereof have the advantages higher mechanical strength, better thermal stability, and better sound absorption properties as compared to the conventional polymeric foams such as materials made by copolymer polyol.

27 Claims, 6 Drawing Sheets

(56) References Cited

FOREIGN PATENT DOCUMENTS

| KR | 1020180020010 A | 2/2018 |
| WO | 2018089645 A1 | 5/2018 |

OTHER PUBLICATIONS

Williams et al., "Effects of cell structure and density on the properties of high performance polyimide foams," Polymers for Advanced Technologies, 2005, 16(2-3), pp. 167-174.
Int'l Search Report for PCT/US2021/018168, dated Jun. 11, 2021.

* cited by examiner

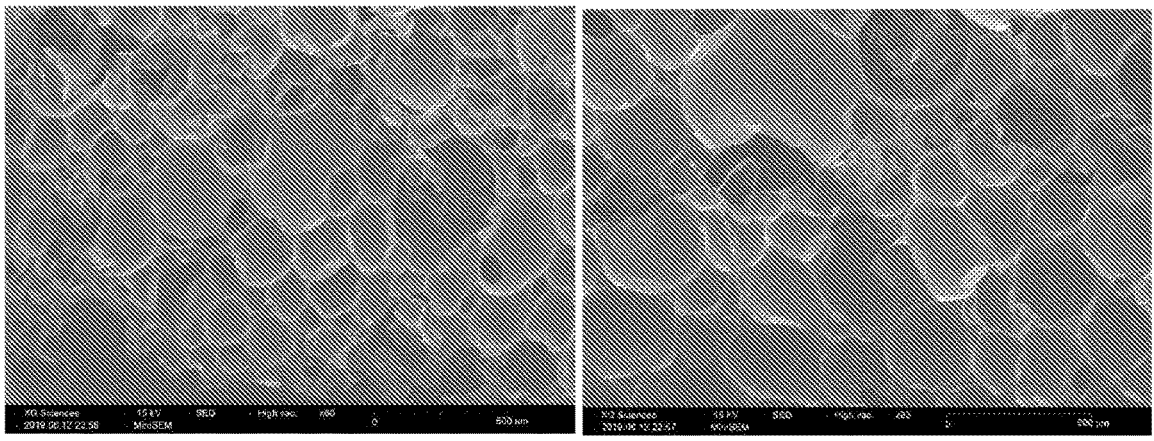
FIG. 2A                                        FIG. 2B
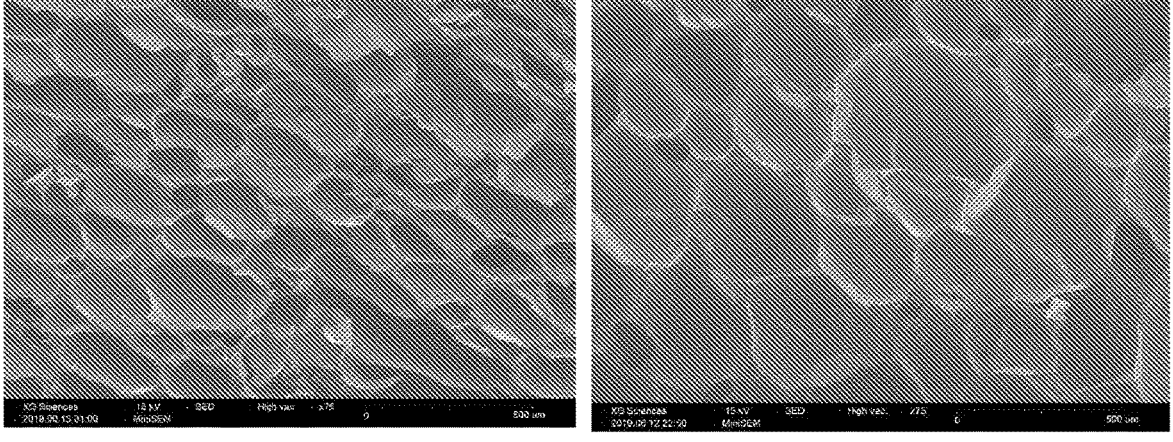
FIG. 3A                                        FIG. 3B

GRAPHENE-MODIFIED POLYMERIC FOAM AND ARTICLES MADE THEREOF

RELATED APPLICATIONS

This application is a U.S. National Phase application, filed under U.S.C. § 371, of International Application No. PCT/US2021/018168, filed Feb. 16, 2021, which claims priority of U.S. Provisional Patent Application Ser. No. 62/977,535, filed Feb. 17, 2020; the contents of which are incorporated herein by reference.

FIELD OF INVENTION

The present invention relates in general to the field of graphene-modified polymeric foam materials and articles made thereof for mechanical, thermal, noise reduction, or sound absorption applications.

BACKGROUND OF THE INVENTION

Polymeric foams are a class of plastic materials that are widely used in consumer and industrial products. For example, polymeric foams are used in seat cushions of sofa, chair, or car seats; they are made into cups, boxes, and containers in the food industry; and they play a major role in thermal insulation applications in refrigerators, freezers, buildings, water heaters etc. Polymeric foams have also found some other applications in engine covers and other components for the purpose of reduction in noise, harshness, and vibration for automobiles, buoyance in boats, acoustic sound-proof products, and explosion suppression in fuel tanks of aircrafts and vehicles.

Polymeric foams consist of a solid and a gas phase mixed together in the form of a cellular core structure. Polymeric foam has a polymer matrix with either air bubbles or air tunnels incorporated in it. The cells can be either closed or open, as illustrated in FIGS. 1A and 1B, respectively. Closed-cell foams are generally more rigid, while open-cell foams are usually flexible. The cells are created when a solid and a gas phase are combined together very rapidly. The gas that is used in the foam is referred to as a blowing agent, which can be either chemical or physical. Chemical blowing agents give off gases through chemical reactions during the foaming process. Physical blowing agents are gases which are introduced during the foaming process that do not react chemically and are therefore inert to the polymer matrix to form bubbles.

The polymer matrix materials can be either thermosets, thermoplastics, or elastomers such as polyurethane (PU), polystyrene (PS), polyvinyl chloride (PVC), epoxy, silicone, polypropylene (PP), polyethylene (PE), polyolefin, polyester, polyimide (PI), nitrile rubber, styrene-butadiene rubber (SBR), ethylene-vinyl acetate (EVA), polychloroprene (PCP), isoprene, neoprene, ethylene propylene diene terpolymer (EPDM), fluoroelastomers, and a combination of any of the above polymers thereof. The most widely used polymeric foams are made of polyurethane and polystyrene.

Cell structures, including cell size, geometry, and total volume (foam density), are critically important in determining the properties of polymeric foams. For example, the cell size influences the mechanical properties of a foam material. Cell size may also affect the thermal conductivity to some extent. Both can be affected by additives in the polymer matrix. Foam density also affect the properties of foam materials. Lower density foams exhibit smaller Young's modulus as the gas phase has the least mechanical strength.

The geometry also affects the mechanical properties. Rodriguez-Pérez et al, (*Cellular Polymers*, Vol. 21, No. 3, 2002, pp. 165-194) examined the effect of cell structure on physical properties using polyolefin foams with isotropic cellular structure produced by a high-pressure nitrogen solution process. The material had no residues of foaming agent, and a wide range but controllable cell size. Nevertheless, the structural characteristics are seen to influence dynamic mechanical response at low temperatures. Williams et al, (*Polym. Adv. Technol.* 2005; 16: 167-174) studied effects of cell structure and density on the properties of high performance polyimide foams and found that the tensile and compressive strengths of the foams increased with cell density. Furthermore, increased closed cell content is a major factor for improving thermal performance.

The foaming process includes impregnating or saturating a polymer with a foaming agent, incurring cell formation, growth, and stabilization by providing the supersaturated polymer-gas mixture with either a sudden increase in temperature or a decrease in pressure. Processing conditions significantly impact the foaming process. For example, too high a temperature may induce cell rupture. On the other hand, too low a temperature may result in a longer foaming time and an increase in viscosity of the polymer, causing restrained cell growth and thus insufficient foaming Therefore, it is important to control the foaming process. Common foaming processes are batch foaming, extrusion foaming, and foam-injection molding.

In addition to surfactants and blowing agents, the cell structure can be modified with other additives. The modification can be achieved by adjusting the viscosity, melt strength, and thermal properties of the polymer and its gas mixture. For example, Landers et al, examined the influence of cell structure of flexible polyurethane foams by additives (*Proceedings of the* 2014 *Polyurethane Technical Conference*, Dallas, TX, USA, 22-24 Sep. 2014). Special non-silicone additives were developed to promote the process of cell coalescence in flexible ether based polyurethane foams without causing severe instability.

Nanoparticles have been used to reinforce polymeric foams for better properties and performance Nanoparticles may not only help improve mechanical, thermal, and chemical properties of the polymeric matrix, but also help improve cell morphology with their abilities to function as nucleating agents. For example, carbon black can act as a nucleating agent for a variety of polymers, modifying the rate of crystallization and the size and shape of the super-molecular units forming the polymeric matrix.

One of the new classes of advanced nanoparticles are graphene nano materials including graphene, multi-layered graphene, graphene nanoplatelet (GnP), graphene oxide (GO), reduced graphene oxide (rGO), doped graphene, and functionalized graphene.

Graphene has superior mechanical strength, excellent electrical and thermal conductivities, good barrier properties, and high surface area with a thin 2-dimensional morphology. These graphene-based materials have received a lot of attentions in recent years for a variety of applications, including as fillers for polymer composite materials for performance enhancement in mechanical strength, light-weighting, chemical resistance, and thermal or electrical conductivities.

In a provisional filing U.S. 62/908,657, a class of graphene-modified polymeric foam materials was disclosed. More specifically, polymeric foam composites were provided with graphene, few-layer graphene, graphene nano-platelet, graphene oxide, reduced graphene oxide, doped graphene, or functionalized graphene being used as a cell modifier to tailor the structure and properties of the foam materials.

Polymeric foam materials have been used for decades in automotive parts, furniture, refrigerators, insulations, and other consumer or industrial goods. One of such materials, for example, is polyurethane foams which are traditionally made by reacting a di- or polyisocyanate with a polyol. During the polymerization process, blowing agents can be used to form cellular structures or foams. The blowing agents can be either physical ones (such as solvents with low boiling point: pentane, acetone, or hexane) or chemical ones (such as water). The physical blowing agents can vaporize and expand the polymer, whereas the chemical blowing agents can react and produce $CO_2$ gas for the same purpose. For example, polyurethane foams can be formed by the reaction of di- or polyisocyanates with active hydrogen-containing compounds. In water blown systems two of the hydrogen-containing compounds are usually water and polyols. The cross-linking reaction between isocyanate and polyol leads to the formation of urethane groups, whereas the reaction between isocyanate and water generates the blowing gas.

Very often other polymers are also incorporated to further improve the properties of polyurethane foams. One example is the use of polymeric polyols or graft copolymer polyols such as styrene-acrylonitrile (SAN) polyols or polyurea modified polyols. SAN polyols are obtained through free radical grafting of styrene and acrylonitrile polyether polyols in the presence of a radical initiator. Such polyurethane foams have higher hardness than those made with a regular polyol due to the effect of hard organic fillers.

While foam materials made from copolymer polyols have some performance advantages over conventional polyurethane forms, the extra step in copolymer polyol manufacturing significantly increase the cost of the foam product. Additionally, SAN copolymer polyols increase the emission of volatile organic compounds in the foam production from the decomposition of styrene and radical initiator. It is therefore desirable to improve the property and performance of conventional polymeric foam materials by other advanced fillers and incorporate them through low-cost manufacturing processes.

Thus there is a need for improved polymeric foam materials using graphene-based materials as a cell modifier. There is a further need to apply the modified foams to manufacture articles for mechanical, thermal, noise reduction, or sound absorption applications.

SUMMARY OF INVENTION

An article made of graphene-modified polymeric foam is provided. The polymeric foam includes a graphene-based cell modifier and at least one polymer resin in which the graphene-based cell modifier used as a filler is intermixed. The graphene-based cell modifier being a two-dimensional flake material with a thickness of from 0.34 nm to 50 nm and a diameter from 0.1 micron to 50 microns. The graphene-based cell modifier being incorporated by infusing the graphene-based cell modifier in one or more of precursors for the polymer resin.

An article made of graphene-modified polymeric foam is provided. The polymeric foam includes a graphene-based cell modifier and at least a polyurethane (polyol) resin in which the graphene-based cell modifier used as a filler is intermixed. The graphene-based cell modifier being a two-dimensional flake material with a thickness of from 0.34 nm to 50 nm and a diameter from 0.1 micron to 50 microns. The graphene-based cell modifier being incorporated by infusing the graphene-based cell modifier in one or more of polyol precursors for the polyurethane resin.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2A and 2B illustrate a comparison of cell structures in a graphene-modified polyurethane (PU) foam with 0.25 wt % graphene nanoplatelet, and a control PU foam without graphene, respectively in accordance with embodiments of the invention;

FIGS. 3A and 3B illustrate a comparison of cell structures in a graphene-modified PU foam with 0.5 wt % graphene nanoplatelet, and a control PU foam without graphene, respectively in accordance with embodiments of the invention;

DETAILED DESCRIPTION OF THE PREFERRED EMBODIMENTS

Figure 1A:
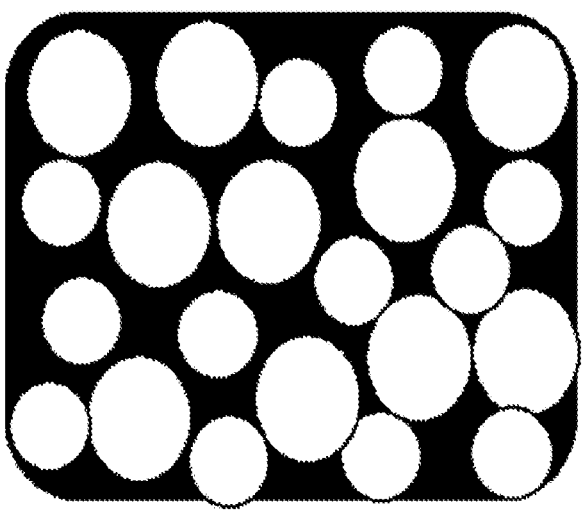
FIGS. 1A and 1B illustrate are prior art views of close-cell and open-cell foam structures, respectively.
Figure 1B:
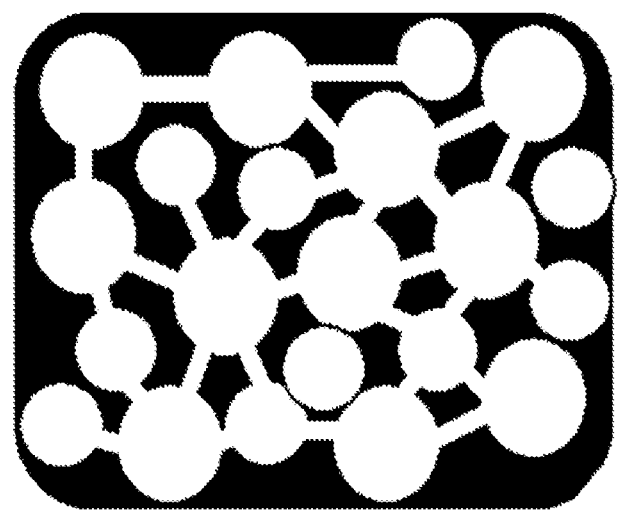

The present invention has utility as graphene-modified polymeric foam materials amenable to conventional foams to yield articles with superior properties relative to like articles absent the inventive graphene cell modifier. Graphene-based cell modifiers are incorporated in the polymer before or during the foaming process to not only improve the mechanical, thermal, electrical, fire retardant, or barrier properties of the polymer matrix itself, but also help modify the size, density, and morphology of cells in the foam, thereby tailoring the properties of the final foam articles.

Embodiments of the inventive graphene-modified polymeric foam materials may be utilized for the manufacturing of articles for mechanical, thermal, noise reduction, or sound absorption applications. Such graphene-modified foams and articles made thereof have the advantages higher mechanical strength, better thermal stability, and better sound absorption properties as compared to the conventional polymeric foams such as materials made by copolymer polyol.

In embodiments of the invention, polymeric foam composites are made with graphene, double-layer graphene, few-layer graphene, graphene nanoplatelet, graphene oxide, reduced graphene oxide, doped graphene, or functionalized graphene as cell modifier to tailor the structure and properties of the foam materials. The graphene-based additives may also work as a functional additive for improving mechanical, thermal, electrical, fire-retardant, and barrier properties of the polymeric foams.

By adding graphene type materials, the cell size and frequency of the foam material can be controlled. The resultant foam structure can be made more uniform than the structure without the graphene, and improvement in properties such as sound absorption coefficient, flexural strength and modulus, compression strength, and heat deflection temperature can be achieved. This phenomenon has been found to be universal for thermoset, thermoplastic, and elastomer systems such as polyurethane (PU), polystyrene (PS), polyvinyl chloride (PVC), epoxy, silicone, polypropylene (PP), polyethylene (PE), polyolefin, polyester, polyimide (PI), nitrile rubber, styrene-butadiene rubber (SBR), ethylene-vinyl acetate (EVA), polychloroprene (PCP), isoprene, neoprene, ethylene propylene diene terpolymer (EPDM), fluoroelastomer, and a combination of any of the above polymers thereof.

In embodiments of the invention, graphene-based additives are infused in polyols. A catalyst package may also be incorporated in a slurry. The graphene/polyol dispersion is used as a precursor to react with di- or polyisocyanates to form polyurethane which is then blown into foam materials or articles for mechanical, thermal, electrical, vibration reduction, sound absorption, flame retardant, and other applications.

As used herein, graphene is defined as a two dimensional material constructed by close-packed carbon atoms including a single-layer graphene, double-layer graphene, few-layer graphene, graphene nanoplatelets, functionalized graphene, doped graphene and a combination thereof.

As used herein, single-layer graphene is defined as a single layer of close-packed carbon atoms.

As used herein, double-layer graphene is defined as a stack graphene of two layers.

As used herein, few-layer graphene, is defined as a stack graphene of 3-10 layers As used herein, graphene nanoplatelet is defined as a stack of graphene of more than 10 layers.

As used herein, graphene oxide is defined as one or more graphene layers with various oxygen-containing functionalities such as epoxide, carbonyl, carboxyl, and hydroxyl groups and a normal C:O ratio around 2.

As used herein, reduced graphene oxide is defined as graphene oxide that has been chemically or thermally reduced with a total oxygen content of typically in the range of 10%-30% depending on the extent of reduction.

As used herein, functionalized graphene is defined as graphene, multi-layer graphene, graphene nanoplatelets, graphene oxide, and reduced graphene oxide that are attached certain functional groups at their surfaces or edges. The functional groups include but are not limited to epoxide, carbonyl, carboxyl, hydroxyl, and amine, etc.

As used herein doped graphene is defined as graphene and graphene oxide that are doped in their crystal structures of certain metallic or non-metallic elements such as nitrogen, oxygen, fluorine, boron, chlorine, potassium, sodium, iron, etc. The graphene materials can be made by chemical or mechanical exfoliation of graphite. The graphene materials can also be made by oxidizing graphite with or without a reduction step.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In specific inventive embodiments the graphene loading in polymeric foams can be from 0.00001 wt % to 10 wt %, with an optimum threshold loading of graphene into the foam structure to make more uniform cells. This optimum level will vary with the type of foam and for variations therein.

In an exemplary embodiment, graphene nanoplatelets are used both as a reinforcement filler and a cell modifier in polyurethane foams. Graphene nanoplatelets were infused in a polyol precursor to form a slurry at a concentration of 0.25 wt %. Catalyst additives were also incorporated into the slurry. Polyurethane foam was formed by a batch blowing process. The addition of 0.25 wt % of graphene exhibited cell structure with reduced cell size, as shown in FIG. 2A, and is more uniform than that of the control polyurethane foam without graphene addition, as shown in FIG. 2B.

In another exemplary embodiment with polyurethane of different molecular weight and with different chemical additives, graphene nanoplatelets were infused in a polyol precursor to form a slurry at a concentration of 0.5 wt %. Catalyst additives were also incorporated into the slurry. Polyurethane foam was also formed by a batch blowing process. The addition of 0.5 wt % of graphene exhibited cell structure with reduced cell size, as shown in FIG. 3A, and more uniform than that of the control polyurethane foam without graphene addition, as shown in FIG. 3B.

It was determined that the threshold loading of graphene in the foam also depended on the size and thickness of the graphene material used. The size of the graphene needs to be smaller than the cell size; otherwise the graphene flake could penetrate and destroy the cell structure. In one embodiment, graphene nanoplatelets with a BET surface area of 300 $m^2/g$, a plate thickness in the range of 1-15 layers, and an average lateral size of less than 5 microns were used to create a graphene infused polyurethane foam. In another embodiment, graphene nanoplatelets with a BET surface area of 500 $m^2/g$, a plate thickness in the range of 1-10 layers, and a lateral size of <3 microns, was used to create a graphene infused polyurethane foam.

Embodiments of the present invention have been designed to utilize graphene's unique and combined mechanical, physical, thermal, and chemical properties to provide benefits that other additives cannot provide. Not to be limited to a particular theory. the modification in cell size and uniformity by graphene is likely through the abilities of graphene as a nucleating agent, strengthening component by reinforcement of the composite material, and a heat distributor. More nucleation usually results in smaller cell sizes in the foam. Better thermal conductivity from graphene may lead to more uniform temperature distribution of the polymer-gas mixture and hence more uniform cell creation, growth, and stabilization. The improvement in mechanical, thermal, electrical, and barrier properties were achieved also through graphene's role as reinforcement or functional filler in the polymer matrix. When well distributed throughout and within the cell structure the two-dimensional nature also acted to deflect or modify energy waves thereby causing an interruption in the phase of such energy waves.

The graphene-based cell modifier illustratively includes graphene, graphene nanoplatelet, graphene oxide, reduced graphene oxide, doped graphene, and functionalized graphene. The polymer resins illustratively include thermoset, thermoplastic, and elastomer systems such as polyurethane (PU), polystyrene (PS), polyvinyl chloride (PVC), epoxy, silicone, polypropylene (PP), polyethylene (PE), polyolefin, polyester, polyimide (PI), nitrile rubber, styrene-butadiene rubber (SBR), ethylene-vinyl acetate (EVA), polychloroprene (PCP), isoprene, neoprene, ethylene propylene diene terpolymer (EPDM), fluoroelastomer, and a combination of any of the above polymers thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

EXEMPLARY EMBODIMENTS

Figure 4:
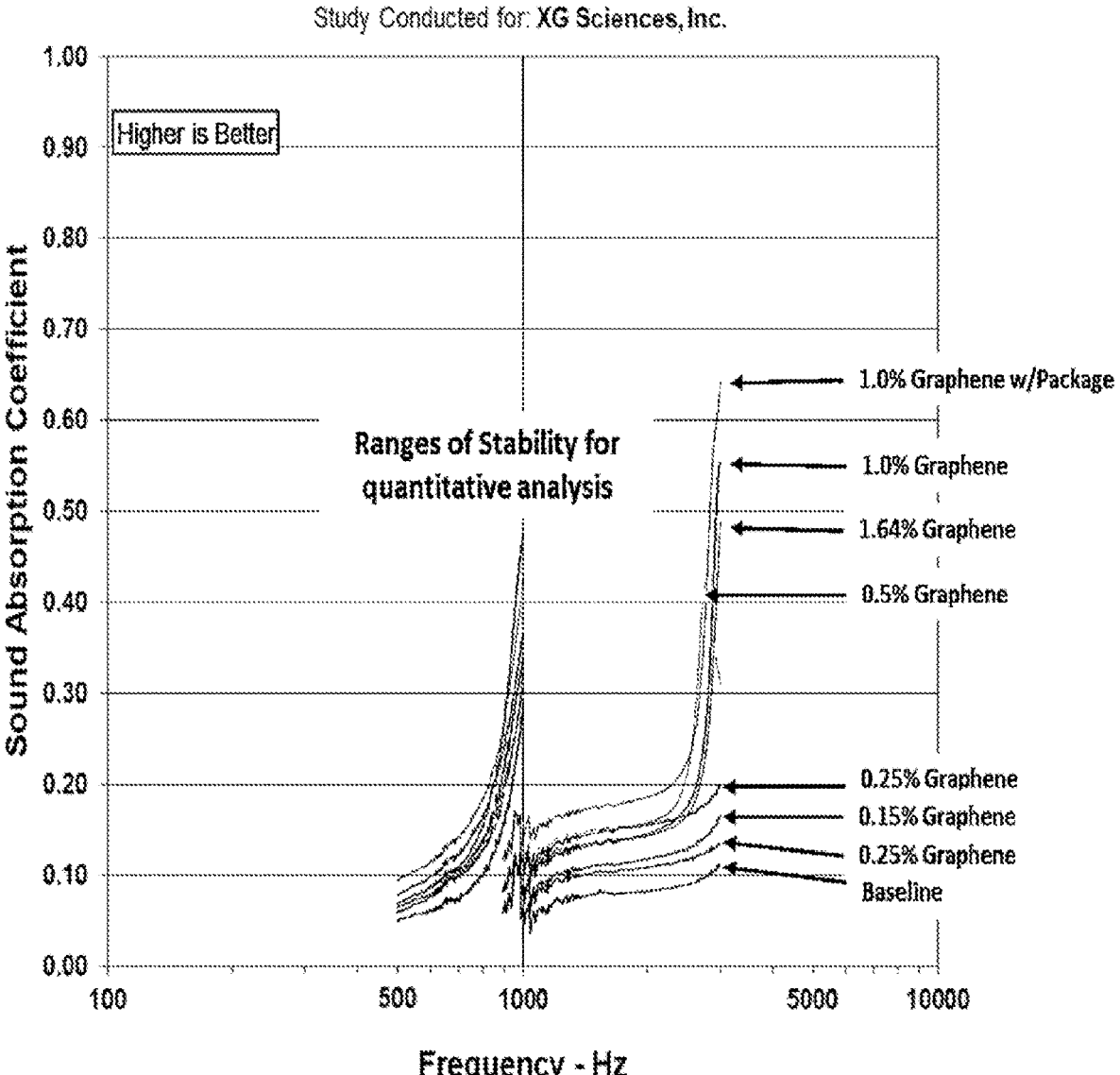
FIG. 4 is a graph showing the effect of graphene modifier on the sound absorption coefficient of rigid polyurethane foam from molded slabs in accordance with embodiments of the invention.

Example 1: Graphene-Modified Rigid Polyurethane Foam by Molding for Sound Absorption Graphene nanoplatelets (C-300 grade, XG Sciences) were infused in polyol at different concentrations with or without a catalyst package. Ridged polyurethane foam slabs were manufactured by molding. The materials were tested for sound absorption using standard test method for impedance and absorption of acoustical materials using a tube, two microphones and a digital frequency analysis system (ASTM E1050-12). More specifically, a 100 mm tube was used for the testing in the frequent range of 100-1,600 Hz and a 29 mm tube was used in the range of 1,000-6,000 Hz. FIG. 4 shows the result where samples of varying amounts of graphene with or without catalytic packages are compared with the baseline sample. Under certain conditions, the sound absorption coefficient is significantly improved. In this embodiment improvement, a higher level of sound absorption coefficient, corresponds to increased amounts of graphene and associated catalytic packages.

Figure 5:
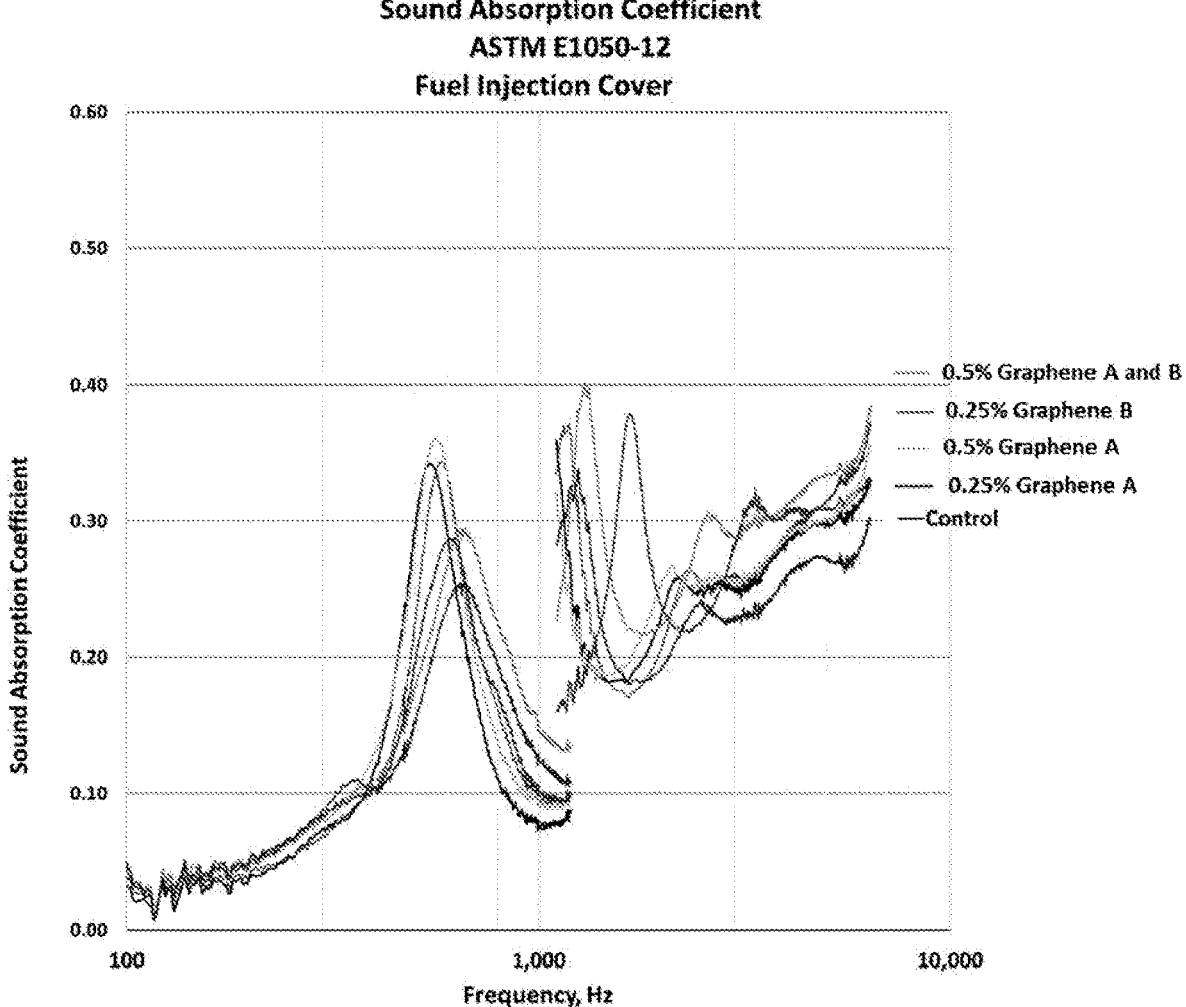
FIG. 5 is a graph showing the effect of graphene modifier on the sound absorption coefficient of flexible polyurethane foam from molded slabs in accordance with embodiments of the invention.

Example 2: Graphene-Modified Flexible Polyurethane Foam by Molding for Sound Absorption Graphene nanoplatelets (C-300 grade, XG Sciences) were infused in polyol at different concentrations with or without a catalyst package. Flexible polyurethane foam slabs were manufactured by molding. The flexible foam samples were skived for the purpose of evaluating the sound absorption coefficient using standard test method for impedance and absorption of acoustical materials using a tube, two microphones and a digital frequency analysis system (ASTM E1050-12). More specifically, a 100 mm tube was used for the testing in the frequency range of 100-1,600 Hz and a 29 mm tube was used in the range of 1,000-6,000 Hz. FIG. 5 is a graph that shows the result of the effect of graphene modifier on the sound absorption coefficient of flexible polyurethane foam from molded slabs. The performance in this flexible foam embodiment shows a higher level of sound absorption coefficient, and is effected by the sizes of the graphene.

Figure 6A:
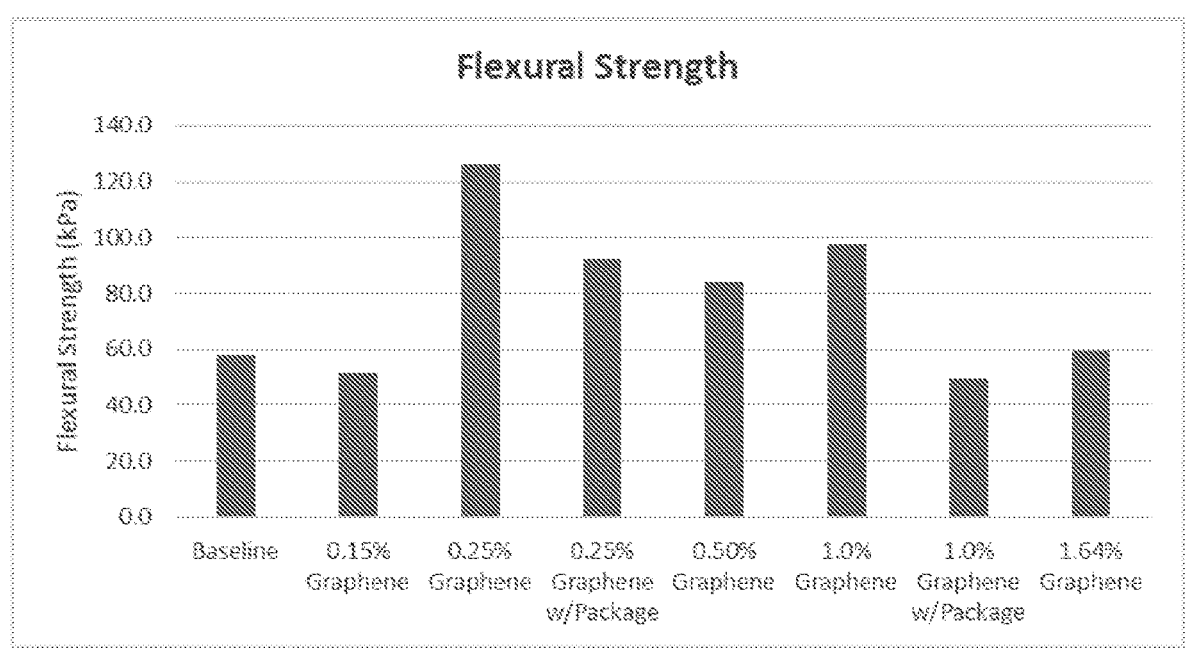
FIG. 6A is a bar graph showing the effect of graphene cell modifier on flexural strength of polyurethane foam from molded slabs in accordance with embodiments of the invention.
Figure 6B:
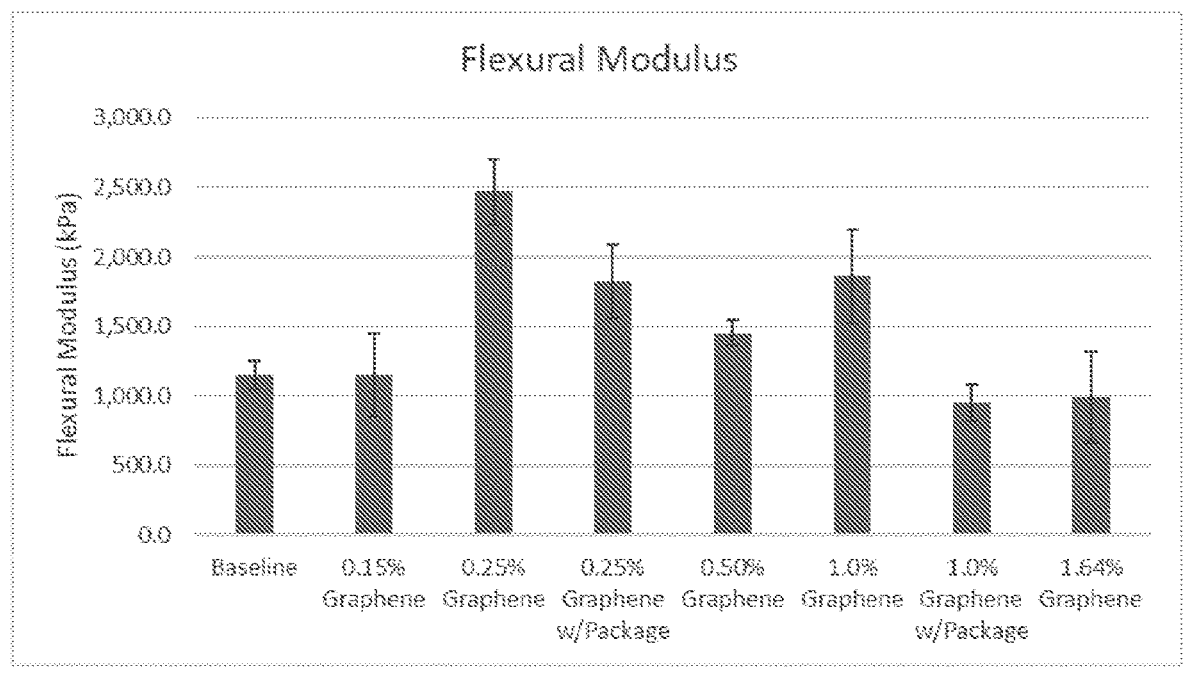
FIG. 6B is a bar graph showing the effect of graphene cell modifier on flexural modulus of polyurethane foam from molded slabs in accordance with embodiments of the invention.

Example 3: Flexural Properties of Graphene-Modified Polyurethane Foam by Molding Graphene nanoplatelets (C-300 grade, XG Sciences) were infused in polyol at different concentrations with or without a catalyst package. Polyurethane foam slabs were manufactured by molding. Flexural strength and flexural modules were tested according to ASTM D70-15. Table 1 and FIGS. 6A and 6B summarize the polyurethane foam formulation, graphene content, and testing results. Addition of graphene nanoplatelets in polyurethane foam at a concentration in the range of 0.25-1 wt % effects cell structures, including cell size, geometry, and improves flexural strength by 30-100% and flexural modulus by 40-150%.

TABLE 1

| Flexural Strength and Flexural Modulus of foam with various graphene loadings. | | |
| --- | --- | --- |
| | Flexural Strength (kPa) | Flexural Modulus (kPa) |
| Baseline | 58.0 | 1,150.0 |
| 0.15% Graphene | 51.3 | 1,150.0 |
| 0.25% Graphene | 126.0 | 2,470.0 |
| 0.25% Graphene w/Package | 92.4 | 1,820.0 |
| 0.50% Graphene | 83.9 | 1,450.0 |
| 1.0% Graphene | 97.8 | 1,860.0 |
| 1.0% Graphene w/Package | 49.5 | 951.0 |
| 1.64% Graphene | 59.1 | 995.0 |

Figure 7:
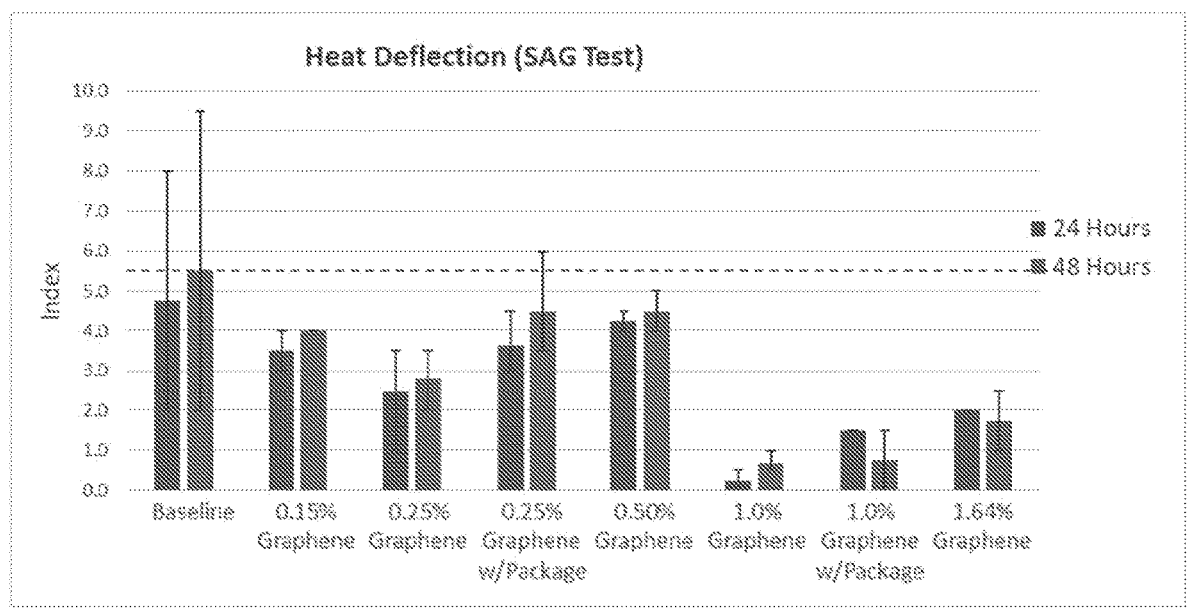
FIG. 7 is a bar graph showing the effect of graphene cell modifier on heat deflection performance of polyurethane foam from molded slabs at 24 and 48 hours in accordance with embodiments of the invention.

Example 4: Heat Deflection of Graphene-Modified Polyurethane Foam by Molding Graphene nanoplatelets (C-300 grade, XG Sciences) were infused in polyol at different concentrations with or without a catalyst package. Polyurethane foam slabs were manufactured by molding. Strip samples were cut for heat deflection test at 150° C. on a 150 mm span. Two to five samples were run for each variation. The sample identifications are the same as shown in Table 1. The testing results are shown in FIG. 7. While all samples would pass the original equipment manufacturer (OEM) automotive requirement of 6 mm maximum deflection, samples with graphene cell modifier showed much improved heat deflection performance, especially when the graphene content is at over 1 wt %.

Example 5: Effect of Graphene Cell Modifier on the Compression Properties of PU Foam Graphene nanoplatelets (C-300 grade, XG Sciences) were infused in polyol at a concentration of 0.5% and polyurethane foams were manufactured. The foams were tested for compression behavior and compared to foams made under the same condition without graphene addition. The results are shown in FIG. 7. For the same extension, the graphene-modified PU foams required a much higher compression stress than those without graphene. It was determined that under the same compression stress, the PU foams modified with graphene have a much less deformation than those without graphene.

Example 6: Effect of Graphene Cell Modifier on Flexural Properties of PU Foams Graphene nanoplatelets (C-300 grade, XG Sciences) were infused in polyol at different concentrations and polyurethane foam was manufactured. The foams were tested for flexural strength and flexural modulus and compared to foams made under the same condition without graphene addition. The results are shown in FIG. 8. Proper amount of graphene cell modifier can improve both flexural strength and flexural modulus of PU foams.

The invention claimed is:

1. An article made of graphene-modified polymeric foam comprising:
   a graphene-based cell modifier and at least one polymer resin in which said graphene-based cell modifier used as a filler is intermixed;
   the graphene-based cell modifier being a two-dimensional flake material with a thickness of from 0.34 nm to less than 5 nm and a diameter from 0.1 micron to less than 0.9 micron; and
   the graphene-based cell modifier being incorporated by infusing said graphene-based cell modifier in one or more of precursors for the polymer resin, wherein the graphene-modified polymeric foam exhibits a flexural strength increase of from about 30% to about 100% relative to a comparable polymeric foam lacking the graphene-based cell modifier.

2. The article of claim 1, wherein the polymeric resin is one of polyurethane (PU), polystyrene (PS), polyvinyl chloride (PVC), epoxy, silicone, polypropylene (PP), polyethylene (PE), polyolefin, polyester, polyimide (PI), nitrile rubber, styrene-butadiene rubber (SBR), ethylene-vinyl acetate (EVA), polychloroprene (PCP), isoprene, neoprene, ethylene propylene diene terpolymer (EPDM), fluoroelastomer, and a combination of any of the above polymers thereof.

3. The article of claim 1, further comprising: one or more additives of a catalyst, a cell stabilizer, a barrier, an anti-oxidant, an anti-corrosion agent, a flame retardant, a lubricant, a dye, a pigment, a plasticizer, a thermal conductive agent, an electrically conductive agent, an insulator, and a filler.

4. The article of claim 1, wherein the foam material is made by one of batch foaming, extrusion foaming, or foam-injection molding.

5. The article of claim 1, wherein the graphene-based cell modifier is one or more of: graphene, few-layer graphene, graphene nanoplatelet, graphene oxide, reduced graphene oxide, doped graphene, functionalized graphene, and a combination thereof.

6. The article of claim 1, wherein the graphene-based cell modifier is present from 0.0001 wt % to 10 wt %.

7. The article of claim 1, wherein the graphene-based cell modifier is present from 0.001% to 5 wt %.

8. The article of claim 1, wherein the graphene-based cell modifier is present from 0.01% to 2 wt %.

9. The article of claim 1, wherein the graphene-based cell modifier is present from 0.1% to 1 wt %.

10. An article made of graphene-modified polymeric foam comprising:
   a graphene-based cell modifier and at least a polyurethane resin in which said graphene-based cell modifier used as a filler is intermixed;

the graphene-based cell modifier being a two-dimensional flake material with a thickness of from 0.34 nm to less than 5 nm and a diameter from 0.1 micron to less than 0.9 micron; and
   the graphene-based cell modifier being incorporated by infusing said graphene-based cell modifier in one or more of polyol precursors for the polyurethane resin, wherein the graphene-modified polymeric foam exhibits a flexural strength increase of from about 30% to about 100% relative to a comparable polymeric foam lacking the graphene-based cell modifier.

11. The article of claim 10, wherein the graphene-based cell modifier is one or more of: graphene, few-layer graphene, graphene nanoplatelet, graphene oxide, reduced graphene oxide, doped graphene, functionalized graphene, and a combination thereof.

12. The article of claim 10, further comprising: one or more additives of a catalyst, a cell stabilizer, a barrier, an anti-oxidant, an anti-corrosion agent, a flame retardant, a lubricant, a dye, a pigment, a plasticizer, a thermal conductive agent, an electrically conductive agent, an insulator, and a filler.

13. The article of claim 10, wherein the foam material is made by one of batch foaming, extrusion foaming, and foam-injection molding.

14. The article of claim 10, wherein the graphene-based cell modifier is present from 0.0001 wt % to 10 wt %.

15. The article of claim 10, wherein the graphene-based cell modifier is present from 0.001% to 5 wt %.

16. The article of claim 10, wherein the graphene-based cell modifier is present from 0.01% to 2 wt %.

17. The article of claim 10, wherein the graphene-based cell modifier is present from 0.1% to 1 wt %.

18. An article made of graphene-modified polymeric foam comprising:
   a graphene-based cell modifier and at least one polymer resin in which said graphene-based cell modifier used as a filler is intermixed, the at least one polymer resin having a cellular structure including a plurality of cells with an average size;
   the graphene-based cell modifier being a two-dimensional flake material with a thickness of from 0.34 nm to less than 5 nm and a diameter from 0.1 micron to less than 5 microns, the diameter of the graphene-based cell modifier being less than the average size of the cells, and having a surface area of 500 m$^2$/g; and
   the graphene-based cell modifier being incorporated by infusing said graphene-based cell modifier in one or more of precursors for the polymer resin.

19. The article of claim 18, wherein the polymeric resin is one of polyurethane (PU), polystyrene (PS), polyvinyl chloride (PVC), epoxy, silicone, polypropylene (PP), polyethylene (PE), polyolefin, polyester, polyimide (PI), nitrile rubber, styrene-butadiene rubber (SBR), ethylene-vinyl acetate (EVA), polychloroprene (PCP), isoprene, neoprene, ethylene propylene diene terpolymer (EPDM), fluoroelastomer, and a combination of any of the above polymers thereof.

20. The article of claim 18, further comprising: one or more additives of a catalyst, a cell stabilizer, a barrier, an anti-oxidant, an anti-corrosion agent, a flame retardant, a lubricant, a dye, a pigment, a plasticizer, a thermal conductive agent, an electrically conductive agent, an insulator, and a filler.

21. The article of claim 18, wherein the graphene-based cell modifier is one or more of: graphene, few-layer graphene, graphene nanoplatelet, graphene oxide, reduced graphene oxide, doped graphene, functionalized graphene, and a combination thereof.

22. The article of claim 18, wherein the graphene-based cell modifier is present from 0.0001 wt % to 10 wt %.

23. An article made of graphene-modified polymeric foam comprising:

a graphene-based cell modifier and at least one polymer resin in which said graphene-based cell modifier used as a filler is intermixed, the at least one polymer resin having a cellular structure including a plurality of cells with an average size;

the graphene-based cell modifier being a two-dimensional flake material with a thickness of from 0.34 nm to less than 5 nm and a diameter from 0.1 micron to less than 5 microns, the diameter of the graphene-based cell modifier being less than the average size of the cells, and having a surface area of 300 $m^2/g$; and the graphene-based cell modifier being incorporated by infusing said graphene-based cell modifier in one or more of precursors for the polymer resin.

24. The article of claim 23, wherein the polymeric resin is one of polyurethane (PU), polystyrene (PS), polyvinyl chloride (PVC), epoxy, silicone, polypropylene (PP), polyethylene (PE), polyolefin, polyester, polyimide (PI), nitrile rubber, styrene-butadiene rubber (SBR), ethylene-vinyl acetate (EVA), polychloroprene (PCP), isoprene, neoprene, ethylene propylene diene terpolymer (EPDM), fluoroelastomer, and a combination of any of the above polymers thereof.

25. The article of claim 23, further comprising: one or more additives of a catalyst, a cell stabilizer, a barrier, an anti-oxidant, an anti-corrosion agent, a flame retardant, a lubricant, a dye, a pigment, a plasticizer, a thermal conductive agent, an electrically conductive agent, an insulator, and a filler.

26. The article of claim 23, wherein the graphene-based cell modifier is one or more of: graphene, few-layer graphene, graphene nanoplatelet, graphene oxide, reduced graphene oxide, doped graphene, functionalized graphene, and a combination thereof.

27. The article of claim 23, wherein the graphene-based cell modifier is present from 0.0001 wt % to 10 wt %.

* * * * *